United States Patent [19]

Pace et al.

[11] Patent Number: 4,720,856
[45] Date of Patent: Jan. 19, 1988

[54] CONTROL CIRCUIT HAVING A DIRECT CURRENT CONTROL LOOP FOR CONTROLLING THE GAIN OF AN ATTENUATOR

[75] Inventors: W. David Pace, Tempe; Dennis L. Welty, Mesa, both of Ariz.

[73] Assignee: Motorola, Inc., Schaumburg, Ill.

[21] Appl. No.: 902,723

[22] Filed: Sep. 2, 1986

[51] Int. Cl.[4] .......................... H04M 1/02; H04M 9/10
[52] U.S. Cl. .................................. 379/390; 379/347; 379/420
[58] Field of Search ............... 379/390, 420, 388, 421, 379/342, 389

[56] References Cited

U.S. PATENT DOCUMENTS

| 4,608,462 | 8/1986 | Blomky et al. | 379/390 |
| 4,648,110 | 3/1987 | Elsässer | 379/388 |

*Primary Examiner*—Stafford D. Schreyer
*Attorney, Agent, or Firm*—Michael D. Bingham

[57] ABSTRACT

A DC control loop is disclosed which is used in conjunction with a control circuit to precisely set the maximum control voltage produced by the control circuit for maximizing the gain of an attenuator controlled thereby. The attenuator includes a current mirror having an output for sourcing a DC current the magnitude of which is proportional to the gain of the attenuator and the control circuit includes a capacitor that is charged or discharged accordingly to vary the magnitude of the control voltage. The DC control loop includes a circuit for sinking the current supplied from the current mirror and a current of a predetermined magnitude, the circuit being coupled to the output of the current mirror and a transistor which is turned on when the magnitude of the current from the current mirror equals the magnitude of the current sank by the circuit to inhibit further charge or discharge of the capacitor whereby the gain of the attenuator is held at a predetermined maximum value.

10 Claims, 4 Drawing Figures

CONTROL CIRCUIT HAVING A DIRECT CURRENT CONTROL LOOP FOR CONTROLLING THE GAIN OF AN ATTENUATOR

BACKGROUND OF THE INVENTION

The present invention relates to control circuits for providing direct current (DC) control voltages and, more particularly, to a control circuit for controlling the gain of an attenuator by providing a variable DC control voltage.

Attenuators are used in a myriad of applications for varying the amplitude of a signal coupled therethrough as the gain thereof is varied. For example, contemporary speakerphones providing half-duplex voice communication typically comprise an attenuator in both the transmit and receive signal paths to enable the half-duplex operation as is understood. The MC34018, manufactured by Motorola Inc., is such a speakerphone wherein the transmit and receive attenuators are operated in a complementary manner and are controlled by a single control circuit providing a DC control voltage which varies the gains of the two attenuators respectively.

A problem with some known attenuator controller circuits is that the DC control voltage is generated independently of the gain of the attenuator. Thus, there is no feedback therebetween to precisely adjust the control voltage to provide good control of the gain of the attenuator. In fact, most if not all known speakerphones use such an open loop control scheme for controlling the gains of the transmit and receive attenuators which is not desirable as the control voltage is not generated accurately.

Hence, a need exists for a control circuit for accurately generating a DC control voltage that is the function of the attenuator gain which is varied by the control voltage.

SUBJECT OF THE INVENTION

Accordingly, it is an object of the present invention to provide an improved attenuator controller circuit.

It is another object of the present invention to provide a closed loop gain control circuit operating in conjunction with an attenuator for generating a DC control voltage to set the gain of the attenuator which DC control voltage is a function of the gain of the attenuator.

Still another object of the present invention is to provide an improved speakerphone having transmit and receive attenuators the gains of which are varied by a DC control loop generating a control voltage that is a function of the gains of the attenuators.

In accordance with the above and other objects there is provided a DC control loop for adjusting the gain of an attenuator which attenuator has an output for providing a DC output current the magnitude of which is proportional to the gain of the attenuator comprising a first circuit including a charge storage device for providing a DC control voltage to control the gain of the attenuator, the magnitude of the control voltage of which is proportional to the charge across the charge storage device, a second circuit having an output coupled to the output of the attenuator for sinking a current of predetermined magnitude at the output thereof and a transistor that is rendered conductive when the output current from the attenuator equals the current sank at the output of the second circuit for maintaining the charge across the capacitor.

DETAILED DESCRIPTION OF THE PREFERRED EMBODIMENT

Figure 1:
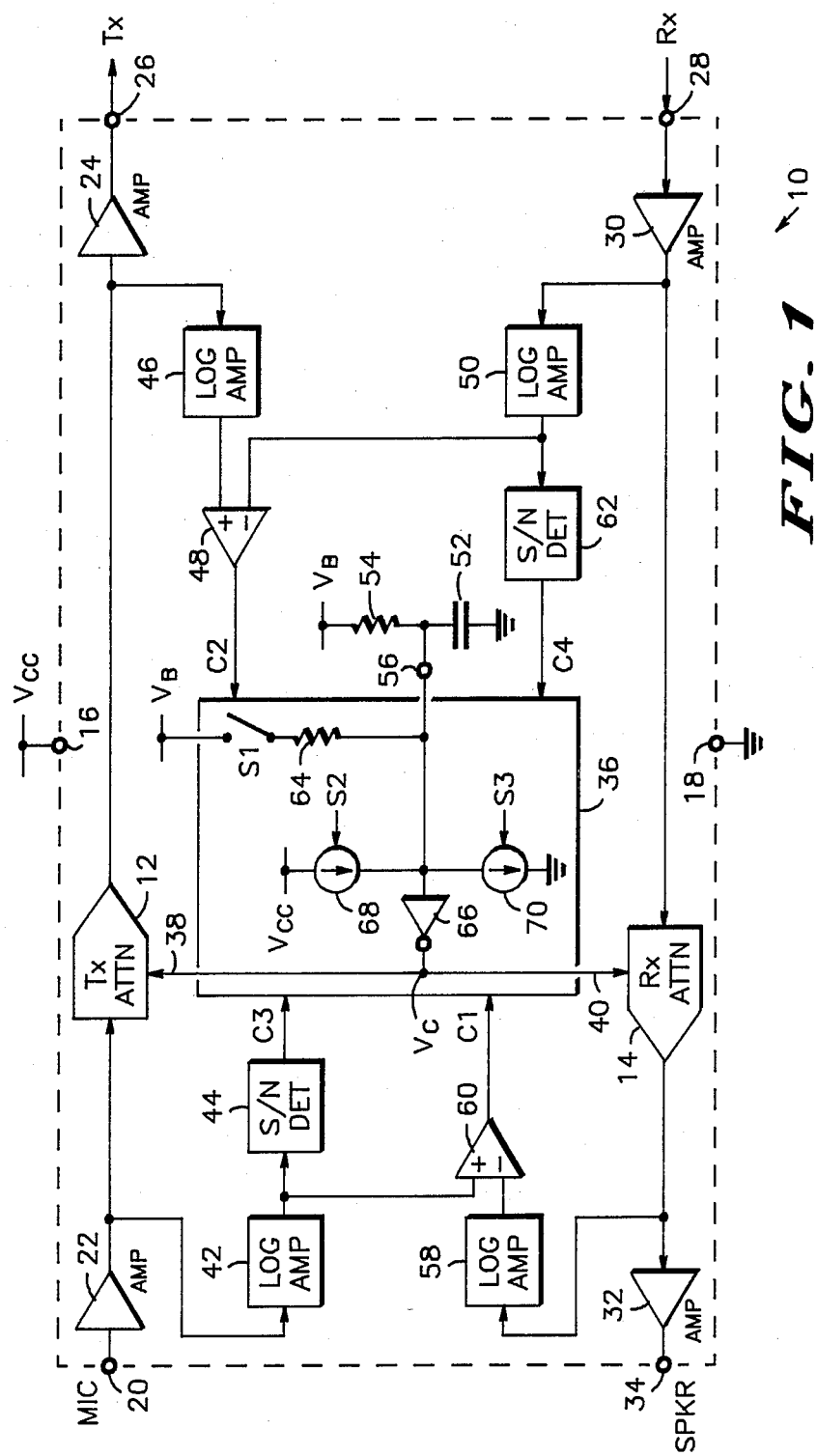
FIG. 1 is a simplified partial schematic and block diagram illustrating the speakerphone using the DC control loop of the present invention.

Turning to FIG. 1, there is illustrated integrated speakerphone circuit 10 of the present invention. Speakerphone circuit 10 is voice-switched between a transmit (Tx) and a receive (Rx) mode in a half-duplex, hands free operation. Half-duplex operation is accomplished by controlling the gains/attenuation of attenuators 12 and 14. Attenuators 12 and 14 operate in a complementary manner, i.e., in response to a direct current (DC) control signal applied thereto the gain of one attenuator is maximized while the gain of the other is minimized. Power supply voltage Vcc is applied across terminals 16 and 18. The transmit signal path including transmit attenuator 12 is coupled to input terminal 20 through amplifier 22. A microphone (not shown) would be connected to terminal 20. The output of transmit attenuator is connected to the transmit output terminal 26 through amplifier 24. The receive signal path includes receive attenuator 14 coupled in series between the output of amplifier 30 to input terminal 28 and the input of amplifier 32 to output terminal 34. Output terminal 34 in operation is connected to a speaker (not shown). Output terminal 26 and input terminal 28 would be coupled to the telephone lines via appropriate circuitry as understood. Attenuator controller circuit 36 provides the control voltage Vc to vary the gains of attenuators 12 and 14 in response to the logic signal supplied at the C1, C2, C3 and C4 inputs thereof as will be discussed in detail hereinafter. The output of amplifier 22 is sensed by logarithmic amplifier 42 and signal to noise detector 44 to produce a logic one signal at C3 whenever the output of the amplifier is voice, otherwise the output of detector 44 is a logic zero. The transmit signal appearing at the output of transmit attenuator 12 is sensed via logarithmic amplifier 46 and compared with the receive signal appearing at the output amplifier 30 via logarithmic amplifier 50. The outputs of logarithmic amplifiers 46 and 50 are supplied to the non-inverting and inverting inputs respectively of comparator 48, the output of which is connected to the C2 input of controller circuit 36. If the amplitude of the transmit signal applied to comparator 48 is greater than the amplitude of the receive signal the output of the comparator will be in a logic one level state.

Speakerphone circuit 10 as so far described is similar to known prior art speakerphones, for instance the aforementioned MC34018 speakerphone circuit. Hence, if the near-end talker is speaking into the microphone and the far-end talker is listening, speakerphone 10 is placed in the Tx mode by C3 and C2 inputs being in a logic one state. In this mode the magnitude of Vc is increased to maximize the gain of transmit attenuator 12 while the attenuation of receive attenuator 14 is maximized. Similarly, in response to a receive signal applied at input 28, speakerphone circuit 10 will be placed in a Rx mode as C2 input is low. If neither talker is speaking, C3 is low and speakerphone circuit 10 is placed in an idle mode wherein the gains of the two attenuators are adjusted to be equal by Vc being reduced to zero volts. The idle mode allows the next person to speak to determine the mode of operation of the speakerphone. At idle, Vc is set to the value $V_B$ by allowing capacitor 52 to be charged through resistor 54. This idle mode is referred to as a slow idle mode as the time constant is large enough to allow slow discharge of capacitor 52.

When the far-end talker pauses, speakerphone circuit 10 should quickly respond to the near-end talker. However, as previously mentioned, speakerphone circuit 10 as thus described, which is similar to prior art speakerphones, may not allow break-in by the near-end talker using only the two point sensing (the outputs of logarithmic amplifiers 46 and 50) due to the signal loss of the transmit signal through attenuator 12 while the circuit is in the receive mode. The subject of the present invention is to provide four point sensing to provide an attenuator control algorithm that detects that voice signals are present in both channels and then quickly switches both attenuators to equal gain and finally resolves which signal channel has the larger signal level. This quick switching to equal gains is referred to as the fast idle mode and is only transitory in nature, i.e., after having set the gains of the two attenuators equal the speakerphone will immediately switch to the mode that has the stronger voice signal.

Referring back to FIG. 1, speakerphone circuit 10 of the present invention includes four point sensing through the addition of logic control inputs C1 and C4 to controller circuit 36. The C1 input senses the amplitudes of the transmit signal appearing at the output of logarithmic amplifier 42 with the receive signal appearing at the output of receive attenuator 14 through logarithmic amplifier 58. These two relative magnitudes are compared by comparator 60 to provide an input signal at the C1 input of control circuit 36. The fourth input to the C4 logic input of controller 36 is provided by signal to noise detector 62. The logarithmic amplifiers provide AC to DC conversion and operate as peak detectors.

Controller circuit 36 is shown functionally as including fast idle mode switch S1 which connects resistor 64 to $V_B$ when closed to permit fast charging or discharging of capacitor 52. Capacitor 52 is connected along with distal end of resistor 64 to inverter buffer amplifier 66 which provides control voltage Vc. Additionally, controller circuit 36 includes current source 68 coupled between Vcc and terminal 56 which when activated by control signal S2 will charge capacitor 52 thereby decreasing Vc. Finally, current source 70 which is coupled between terminal 56 and circuit ground will discharge capacitor 52 when activated to cause Vc to increase.

As will be described in more detail later, the output logic signals from comparator 60, comparator 48, detectors 44 and 62 drive integrated injection logic ($I^2L$) circuitry within controller 36 to operate switches S1, S2 and S3 for adjusting the gains of the attenuators by varying Vc by, in turn, charging and discharging of capacitor 52 during the operating modes of speakerphone circuit 10.

Speakerphone circuit 10 will be put in the transmit mode whenever the logic inputs to C1, C2 and C3 are all high. This indicates that the transmit signal is both voice and is greater in amplitude than the receive signal. Conversely, if the logic inputs to C1 and C2 are both zero and C4 is a logic one, speakerphone 10 is put in a receive mode of operation. The fast idle mode is selected whenever C1 and C2 inputs differ and either C3 or C4 inputs are in a logic one state. This condition occurs when there is a conflict as to which signal is present and has the greater amplitude. The fast idle mode is then selected by S2 and S3 switching off current sources 68 and 70 while S1 connects resistor 64 between terminal 56 and $V_B$. Capacitor 52 is then allowed to quickly charge or discharge to VB to adjust the level of Vc to set the gains of attenuators 12 and 14 equal. The attenuators then will switch to either the receive or transmit mode from the fast idle mode when the C1 and C2 inputs match. This occurs due to the fact that because the gains of the two attenuators are equal the stronger voice signal will cause the output of comparators 48 and 60 to go to equal output states. The switching to and from the fast idle mode is sufficiently quick so that no noticeable delay in operation can be heard.

Figure 2:
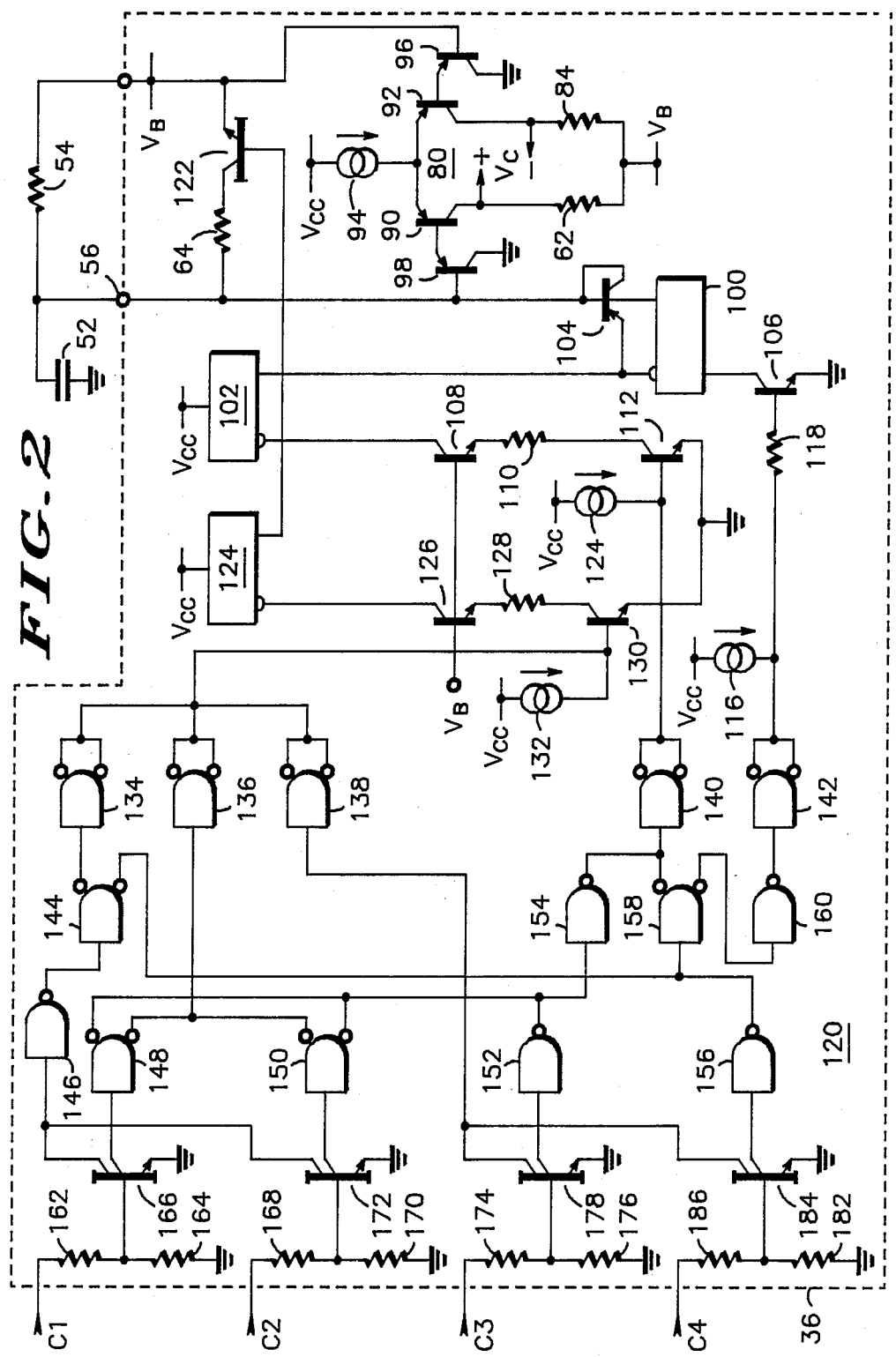
FIG. 2 is a schematic diagram illustrating the control circuit of the speakerphone of FIG. 1.

FIG. 2 shows controller circuit 36 in more detail. Vc is a differential voltage that is produced at the outputs of differential amplifier 80 across resistors 82 and 84 having the polarity as illustrated. Differential amplifier is conventional in structure comprising PNP transistors 90 and 92 differentially connected at the emitters thereof to current source 94 with their respective collectors coupled through resistors 82 and 84 to $V_B$. The bases of transistors 90 and 92 are connected to the emitters respectively of PNP transistors 98 and 96 each of whose collectors are connected to system ground. The base of transistor 96 is returned to the voltage $V_B$ (which may be equal to Vcc/2) while the base of transistor 98 is returned to terminal 56. The base of transistor 98 is also connected to the output of current mirror 100 the input of which is connected to the output of current mirror 102. The common terminal of current mirror 100 is connected in series with the collector-emitter conduction path of NPN transistor 106. Diode connected transistor 104 is coupled between the input and output of current mirror 100. The common terminal of current mirror 102 is returned to power supply voltage Vcc. The input of current mirror 102 is connected in series with the collector-emitter conduction path of NPN transistor 108 whose base is returned to bias potential Vb. The emitter of transistor 108 is connected via resistor 110 in series with the collector-emitter conduction path of NPN transistor 112, the emitter of the latter being returned to circuit ground. The base of transistor 112 is coupled to the current source 114 and to an output of $I^2L$ logic control circuit 120. Similarly, the base of transistor 106 is connected to both current source 116 and an output of logic control circuit 120 via resistor 118.

Speakerphone circuit 10 is placed in the Tx mode by transistors 106 and 112 being rendered conductive by base current being supplied thereto from current sources 116 and 114 respectively. When transistor 112 is turned on transistor 108 is turned on to sink current from current mirror 102. An output current is then sourced from the output of current mirror 102 that is sunk at the input of current mirror 100 which is rendered operative by transistor 106 being turned on. The input current to mirror 100 is mirrored in the output thereof which causes capacitor 52 to be discharged and transistors 98 and 90 to be turned on harder than transistors 92 and 96 to increase Vc in a positive sense. Thus, transmit attenuator 12 will have maximum gain while receive attenuator 14 has maximum loss. The Rx mode is selected by transistor 106 being turned off as base current is stolen therefrom through logic control circuit 120 to render current mirror 100 inoperative. However, transistor 112 remains on such that current mirror 102 still supplies an output current. In this condition, diode 104 will source the output current from current mirror 102 to capacitor 52 to charge the same. This causes transistors 92 and 96 to conduct harder than transistors 90 and 98 such that Vc becomes a negative value. The gain of receive attenuator 14 will then be maximized while that of transmit attenuator 12 is minimized. In the aforementioned slow idle mode both transistors 106 and 112 are turned off which renders both current mirrors 100 and 102 inoperative. Capacitor 52 will then be charged or discharged through resistor 54 thereby biasing the base of transistor 98 at the potential $V_B$. Hence, transistors 90, 92, 96 and 98 conduct equally wherein Vc becomes zero volts and the gains of the attenuators are equal.

The fast idle mode is selected by rendering both current mirrors 100 and 102 inoperative as described above and turning transistor switch 122 on to connect resistor 64 in parallel with resistor 54. Transistor 122 is turned on by having base current supplied to the base thereof from the output of current mirror 124. Output current is sourced from current mirror 124 when it is rendered operative by transistor 126 being turned on to sink input current therefrom through its collector-emitter conduction path. With the base of transistor 126 connected to Vb the transistor will be turned on by transistor 130, which has its collector-emitter conduction path connected in series with the emitter of transistor 126 and circuit ground via resistor 128, being turned on as base current is supplied thereto from current source 132. Base current is supplied to transistor 130 whenever the output of logic control circuit 120 connected at the base of the transistor is at a logic one output state.

$I^2L$ logic control circuit 120 comprises a plurality of interconnected $I^2L$ NAND gates 134–160 which are responsive to the logic inputs supplied to the C1, C2, C3 and C4 inputs for selectively turning on and off transistors 106, 112 and 130 as previously described. Thus, transistor 130 is turned on only when all of the outputs from gates 134, 136 and 138 are high which permits base current drive to be supplied thereto. If any output from these gates is low, the current sourced from current source 132 is conducted through the gate(s) with the low output(s) and transistor 130 is turned off. Likewise, if the output from gates 140 and 142 are low transistors 112 and 106 will be respectively turned off.

The C1 input of controller 36 is coupled through the resistive divider comprising resistors 162 and 164 to the base of $I^2L$ transistor 166. Transistor 166 is a multi-collector device having one collector connected to the input of gate 146 and the other collector connected to the input of gate 148. The emitter of transistor 166 is returned to circuit ground. The C2 input is connected to the base of transistor 172 through the resistive divider comprising resistors 168 and 170. One of the collectors of transistor 172 is connected to the input of gate 146 while the other is connected to the input of gate 150. The C3 input is connected through resistive divider comprising resistors 174 and 176 to the base of transistor 178 having one collector connected to the input of gate 138 and the other to the input of gate 152. Finally, the C4 input is connected through the resistive divider comprising resistors 180 and 182 to the base of transistor 184 having one collector connected to the input of gate 138 and the other to the input of gate of 156. The emitters of transistors 172, 178 and 184 are all returned to circuit ground.

As an example of the operation of logic control circuit 120 it is assumed that C1 input is zero while inputs C2, C3, and C4 are high, a logic one. In this example speakerphone circuit 10 will be place temporarily in the fast idle mode as transistor 122 is turned on. Thus, with C1 and C2 "0" and "1" respectively, the output of gate 146 is forced high to force the outputs of gates 144 and 134 to go low and high respectively. The output of gate 148 is simultaneously forced low to force the output of gate 136 to a high output state. The output states of transistors 178 and 184 force the output of gate 138 high. Therefore, all of the outputs of gates 134, 136 and 138 are high which permits current source 132 to turn on transistor 130 as previously described to cause transistor 122 to be switched on. Simultaneously, the output of gate 148 being low forces the output of gate 154 high which, in conjunction the output of gate 144 being low forcing the output of gate 158 high, causes the output of gate 140 low. The current from current source 114 is then sunk by gate 140 to turn off transistor 112. Since transistor 112 is turned off current mirror 102 is rendered non-operative thereby preventing current mirror 100 from sinking output current therefrom. Thus, capacitor 52 is quickly charged or discharged depending on the previous mode of operation, to cause Vc to go to zero volts.

Figure 3:
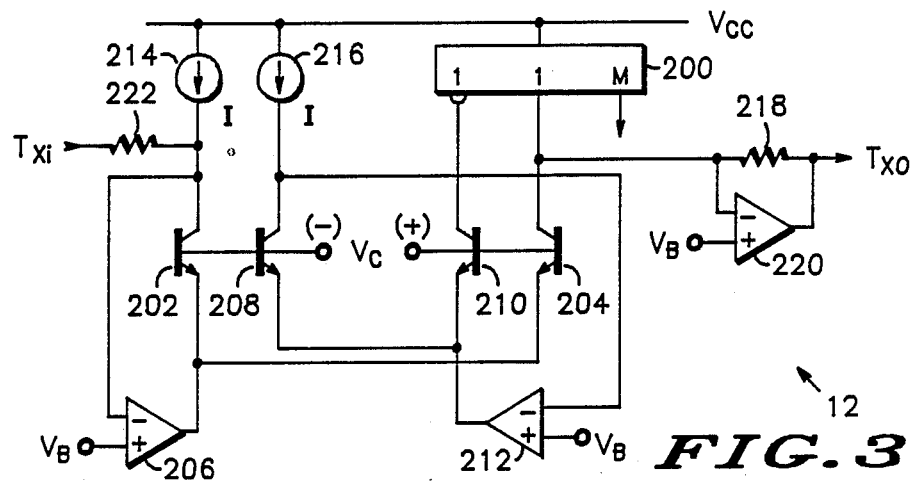
FIG. 3 is a simplified schematic of the transmit attenuator of the speakerphone of FIG. 1.

Referring now to FIG. 3 there is illustrated a simplified schematic of Tx attenuator 12. It is understood that Rx attenuator 14 is identical in structure and function to attenuator 12 except that the polarity of Vc supplied thereto is reversed. Moreover, except for the addition of the control loop output (M) from current mirror 200, Tx attenuator 12 is the same as prior art attenuators. Transistors 202 and 204 in conjunction with operational amplifier 206 comprise a log-antilog amplifier as do transistors 208, 210 and operational amplifier 212. In a quiescent state (no Ac input signal applied at the Txi input) current source 214 sources the current I to the collector of transistor 202. The DC current is held constant by the feedback between the inverting input and the output of operational amplifier 206. Similarly, a DC current I is supplied from current source 216 to transistor 208. Transistor 210 being differentially connected to transistor 208 and matched thereto will sink a current at the input of current mirror 200. This current is mirrored and sourced at the output of the current mirror to the collector of transistor 204 which sinks the current since it is matched with transistor 202. Hence, no DC current flows through resistor 218 and operational amplifier 220 to output Txo. As Vc increases to increase the gains of transistors 210 and 204 the DC current flowing through transistor 204 cancels the increased current sourced from the output of current mirror thereto due to transistor 210 conducting harder.

During AC operation the AC transmit signal is applied to the Txi input and to Tx attenuator 12 via resistor 222. The AC output voltage of operational amplifier 206 is proportional to the logarithm of the AC input signal which produces an output voltage at the Txo output that is proportional to the anti-logarithm thereof as is understood; Txo is coupled to the output of the attenuator. The total gain of Tx attenuator 12 is equal to the ratio of resistors 218 and 222 times the gain factor of the log-antilog amplifiers.

Figure 4:
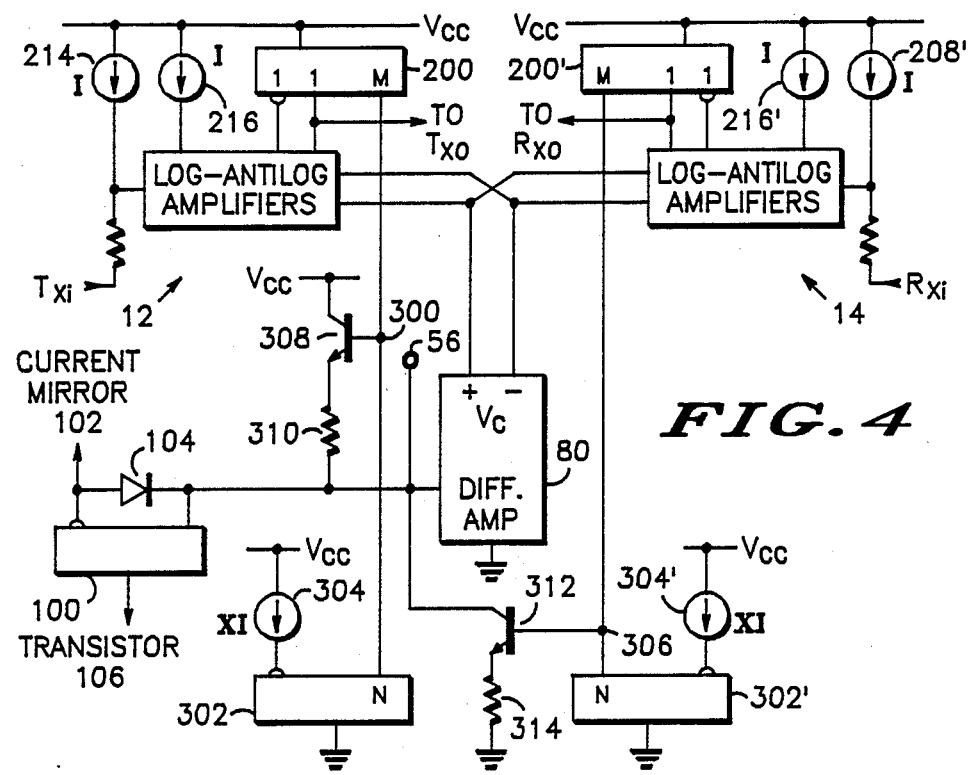
FIG. 4 is, a partial block and schematic diagram of the DC control loop of the present invention.

For good gain control the control voltage must be precise. In the present invention a DC control loop is provided for generating Vc accurately without the need for precise voltage references. Turning now to FIG. 4, the attenuator control loop for setting the gain of the attenuators to a predetermined maximum value is described. It is to be understood the components of FIG. 4 corresponding to like components of FIGS. 1, 2 and 3 are referenced by the same numbers. In addition, component of Rx attenuator 14 corresponding to like components of Tx attenuator 12 are referenced by prime numbers.

The DC control loop portion for controlling Tx attenuator 12 includes the M ratioed output of current mirror 200 which sources a DC current to node 300 equal in magnitude to M times the current I that is sunk at the input of current mirror 200. Current mirror 302 having an output coupled to node 300 will sink a current therefrom having a value that is N times the current sourced to the input thereof supplied from current source 304. As shown current source 304 supplies a current equal to X times I to the input of current mirror 302 the common terminal of which is connected to circuit ground. Current ratios M, N and X are positive numbers. Similarly, DC control loop portion controlling Rx attenuator 14 comprises the M output of current mirror 200' connected to node 306 to which the output of current mirror 302' is coupled. The input of current mirror 302' is connected to the output of current source 304'.

As previously described, in the transmit mode of operation current mirror 100 sinks current from terminal 56 to discharge capacitor 52 which increases Vc. As Vc becomes positive the gain of Tx attenuator 12 increases to a maximum value while the gain of Rx attenuator 14 is minimized. As the gain of Tx attenuator increases the magnitude of the output current from current mirror 200 sourced to node 300 also increases proportionally until it equals the magnitude of current sank by current mirror 302, viz., XNI. Thereafter, transistor 308 will be turned on since base current is then available for sourcing current via resistor 310 to terminal 56 which prevents further discharge of capacitor 52. Vc is therefor set to a precise maximum value. Simultaneously, current mirror 302' will want to sink more current from node 306 than supplied from current mirror 200' since the gain of Rx attenuator 14 is at a minimum value. Thus, transistor 312 is turned off.

In the receive mode current is sourced through diode 104 to raise the voltage at terminal 56 which forces Vc to go negative. The gain of Rx attenuator 14 will then begin increasing until the value of current sourced from current mirror 200' equals the current sank by current mirror 302', again XNI. Thereafter transistor 312 is rendered conductive by excess current being supplied to the base thereof to sink current to circuit ground via resistor 314. This will maintain the voltage at terminal 56 constant. In the Receive mode the gain of Tx attenuator 12 is at a minimum value whereby transistor 308 is turned off as the current sank at node 300 is greater than the current sourced thereto.

Hence, what has been described above is a novel DC control loop for setting the gain of an attenuator to a precise value without requiring accurate and precise voltage references.

We claim:

1. A direct current (DC) control loop for setting the gain of an attenuator circuit, the gain of the attenuator circuit being varied in response to a control voltage applied thereto, comprising:
   a control circuit for providing the control voltage and including a charge storage means, the magnitude of the control voltage varying as the charge across said charge storage means is varied;
   first circuit means for providing a current at an output thereof the magnitude of which is proportional to the gain of the attenuator circuit;
   second circuit means for sinking a current of a predetermined magnitude, said second circuit means being coupled to said output of said first circuit means; and
   third circuit means responsive to said current provided by said first circuit means becoming equal to said current sank by said second circuit means for maintaining the charge across said charge storage means whereby the control voltage is held at a value corresponding to a desired maximum gain of the attenuator circuit.

2. The DC control loop of claim 1 wherein said first circuit means includes a first current mirror circuit having an input from which a current proportional to the gain of the attenuator is sunk and an output at which said current is sourced, said current from said first circuit means being M times the value of said input current of said current mirror where M is a positive number.

3. The DC control loop of claim 2 wherein said second circuit means includes:
   a current source for supplying a current at an output thereof having a predetermined magnitude; and
   a second current mirror having an input coupled to said output of said current source and an output coupled to said output of said first current mirror, said current of said predetermined magnitude being sunk at said output and being N times the magnitude of said current supplied from said current source.

4. The DC control loop of claim 3 wherein said third circuit means is a transistor having an emitter coupled to said charge storage means, a collector coupled to a terminal at which is supplied an operating potential and a base coupled both to said outputs of said first and said second current mirrors.

5. The DC control loop of claim 3 wherein said third circuit means is a transistor having an emitter coupled to a terminal to which is supplied circuit ground, a collector coupled to said charge storage means and a base coupled both to said outputs of said first and said second current mirrors.

6. A speakerphone including a transmit attenuator and a receive attenuator and a control circuit for providing a control voltage for varying the gains of the transmit and receive attenuators in a complementary manner, the control circuit including charge storage means for varying the magnitude of the control voltage as the charge thereacross is varied, comprising a DC control loop coupled between a respective output of each of the attenuators and the charge storage means for inhibiting further charge or discharge of the charge storage means when the control voltage has reached a predetermined maximum positive or negative value.

7. The speakerphone of claim 6 wherein:
   the transmit attenuator includes a current mirror circuit having an output for supplying a DC current the magnitude of which is proportional to the gain of the attenuator; and the receive attenuator includes a current mirror circuit having an output for supplying a DC current the magnitude of which is proportional to the gain of the attenuator.

8. The speakerphone of claim 7 wherein said DC control loop includes:

first circuit means for sinking a current of a predetermined magnitude, said first circuit means being coupled to said output of said current mirror of said transmit attenuator;

second circuit means for sinking a current of a predetermined magnitude, said second circuit means being coupled to said output of said current mirror of said receive attenuator;

a first transistor which is rendered conductive in response to said current from said current mirror of said transmit attenuator becoming equal to said current sank by said first circuit means for maintaining the charge across said charge storage means whereby the control voltage is held at said predetermined maximum positive value; and a second transistor which is rendered conductive in response to said current from said current mirror of said receive attenuator equaling said current sank by said second circuit means for maintaining the charge across said charge storage means whereby the control voltage is held at said predetermined maximum negative value .

9. The speakerphone of claim 8 wherein said first circuit means includes:

a first current source for supplying a current at an output thereof having a predetermined magnitude; and a first current mirror having an input coupled to said output of said first current source and an output coupled to said output of said first circuit means, said current of said predetermined magnitude being sunk at said output of said first current mirror and having a magnitude equal to N times the magnitude of said current supplied from said current source.

10. The speakerphone of claim 9 wherein said second circuit means a second current source for supplying a current at an output thereof having a predetermined magnitude; and a second current mirror having an input coupled to said output of said current source and an output coupled to said output of said second circuit means, said current of said predetermined magnitude being sunk at said output of said second circuit means and having a magnitude equal to N times the magnitude of said current supplied from said current source.

* * * * *